June 30, 1959     S. N. F. LUBOSHEZ     2,892,217

PROCESS FOR BENDING PLASTIC SHEET MATERIAL

Filed Aug. 20, 1954

INVENTOR
S.N.F. LUBOSHEZ

BY Moore and Hall

ATTORNEYS

United States Patent Office 2,892,217
Patented June 30, 1959

2,892,217

PROCESS FOR BENDING PLASTIC SHEET MATERIAL

Sergius N. Ferris Luboshez, Bethesda, Md.

Application August 20, 1954, Serial No. 451,183

7 Claims. (Cl. 18—56)

The present invention is concerned with the controlled bending of plastic sheet material.

It is an object of the invention to obtain a straight bend precisely along a desired line.

It is an object of the invention to prevent heat deformation of adjacent surfaces of the plastic material being processed.

It is one step of the invention to provide insulation immediately along the line of bend of the material to permit a suitable local temperature rise when heat is applied.

It is another step of the invention to provide metal contacts against all surfaces contiguous to the bend in the plastic material being processed to insure even low temperatures by balanced removal of heat by conduction.

The bending of plastic sheet material has heretofore been subject to substantial irregularity, drift or lack of registration, warping and deformation of adjacent surfaces by the applied heat with improper cooling strains and stresses in the treated material. In general, the plastic sheet material being treated is draped loosely over the upper horizontal edge of a metal blade of good heat conducting characteristics such as copper or silver. Ample room is allowed at the upper edge for the insertion of a solid insulator or to provide an insulating air channel. Two spaced metal clamp members of substantial volume which may be solid or provided with cavities to hold material having a high specific heat such as water are employed. In any event, the clamp members should have sufficient heat absorption capacity that the clamp faces are able to extract heat quickly from the plastic sheet under treatment. The metal clamp members are brought to bear upon the plastic sheet material and press it firmly against the central blade from both sides.

A heated member, having a flat surface which may be recessed to receive the upper edge being treated, is pressed against the bend of the material. Where air insulation is used, the heated member may be applied momentarily to the bend of the plastic which fits into a channel of suitable configuration in the heated member. The heated member may be so constructed that the bend in the plastic sheet is forced down against the edge of the upstanding horizontal blade which quickly conducts heat away and the formed plastic cools and sets in its new form.

It is therefore one of the primary objects of the invention to form or to bend plastic sheets or material by the highly localized application of heat for a short period of time under conditions which both maintain the shape of the remainder of the plastic material by pressure and simultaneously prevent substantial temperature rise therein.

In the drawings.

In the drawings like numerals refer to like parts.

Figure 1:
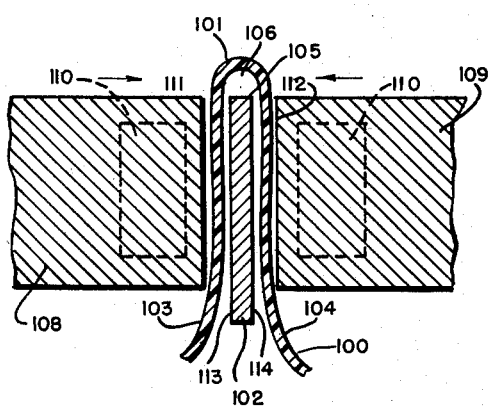
Figure 1 is a fragmentary vertical section of a schematic showing of the principal elements of a device for practising the invention in open position.

The invention comprises, as noted above, a process by which a thermoplastic sheet of material may be accurately bent along a definite line within very close tolerances. In one of its broader forms, a sheet of thermoplastic material 100 is loosely bent or folded to form a bight or fold area 101 which is positioned over a vertical knife member 102 of copper, silver or other metal or metallic alloys capable of absorbing and conducting heat rapidly. The side portions 103 and 104 fall more or less loosely along the sides of the blade 102 which is positioned therebetween. The bight 101 of the thermoplastic sheet 100 is spaced from the upper edge 105 of metallic blade 102 so as to provide an insulation area 106.

On either side of the blade 102 and spaced laterally therefrom are clamping members 108 and 109. Clamping members 108 and 109 are preferably of metal having a characteristically relatively high heat conductivity constant, and may be relatively massive so as to provide a substantial heat absorption capacity. For some applications, particularly in production work, it may be desirable to channel the members 108 and 109 as shown at 110 for the circulation of cooling fluids, preferably those having a high specific heat such as water.

Figure 2:
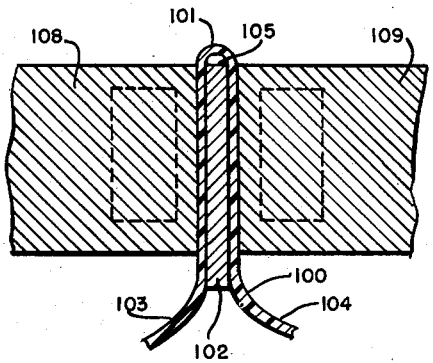
Figure 2 is a fragmentary vertical section of the schematic showing of Figure 1 in closed position.

It is to be noted that the faces 111 of clamp member 108, and 112 of clamp member 109 conform to the corresponding side faces 113 and 114 of the blade member 102. This correspondence enables the device to clamp the sheet material 100 firmly and hold it against deformation during the bending process, and at the same time place the metallic members 102, 108 and 109 in such close contact with the material of plastic sheet 100 that the temperature of the side portions 103 and 104 of plastic sheet 100 is maintained substantially a constant throughout the process. It will be understood that the faces 111 and 112, and the faces 113 and 114 may be of almost any desired shape so long as they are compatible and fit together to hold the side members 103 and 104 firmly therebetween and in good heat conducting relation. With the plastic sheet 100 loosely in position over the blade 102, as shown in Figure 1, and making sure that there is ample space above the knife member for insulation, the clamping members 108 and 109 may be brought firmly together into close clamping and heat conducting relation with the side members 103 and 104 and the blade 102, as shown in Figure 2.

Figure 3:
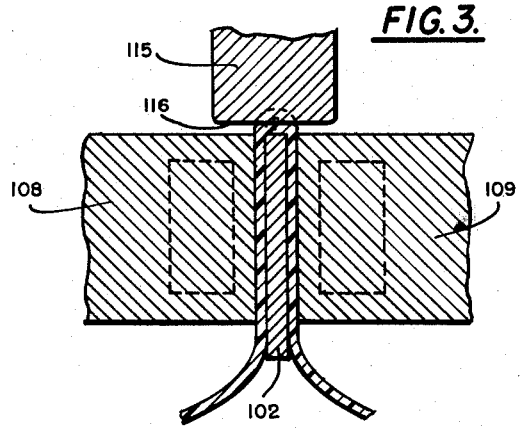
Figure 3 is a fragmentary vertical section of the parts of Figure 2 with heat application means in active position.
Figure 4:
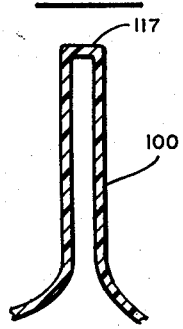
Figure 4 is a vertical section of a plastic sheet after processing according to the invention.

With the sheet 100 positioned in the apparatus as above described, a heat application member 115 provided with a suitable surface 116 is pressed against the bight 101 and forces it down against the upper edge 105 of the blade 102. This application of heat by the surface 116 plasticizes or softens the material of the bight 101 for a very short period of time, and when the bend or bight 101 is pressed into firm contact with the edge 105 of metal blade 102, heat is conducted away at such a rate that the plastic material of the bight 101 cools and sets in its new conformation, forming an edge which may take the contour of that shown at 117 in Figure 4. The insulating space is present in Figures 1–3, whether or not it is filled with air or insulator 107.

It will be understood that the face 116 of the heat applicator 115 may be recessed to receive the material of bight 101 and to give it any suitable shape other than that shown at 117 which may be desired. As in the case with the faces 111 and 112, the face 116 may be recessed in any manner to receive a mating configuration on the upper edge 105 of the blade 102. Such configuration may depart from that shown at 117 by forming a bowed hinged joint in order to allow repeated flexing and distribute the stress over a larger area than that where a sharp angle is used, so as to reduce the unit stress within the material. Instead of being flat as shown, the edge portion 117 may be an arc of a circle or any other suitable curve which may be selected.

Of course if it is desired to crimp or otherwise change the configuration of the side walls 103 and 104 of the plastic sheet material, the clamp members 108 and 109 may be heated if desired, and the knife member 102 alone maintained cold. This action may be made possible by the controlled intermittent flow of coolant in the chambers 110. Where automatic operation is employed, it may be desirable to taper the mating faces of the clamp members and the blade element to force the sheet material upward slightly during the clamping action so as to provide the insulating space above the upper edge of the blade element as shown in Figure 2. This action can also be accomplished by a differential sliding relation achieved by very small surface irregularities or characteristics which produce a differential gripping action between the faces of the jaw of the clamp members and the faces of the blade element. In this way, the blade element may be permitted to move downward slightly to provide space 106. The action here described is of course relative, and other motions may be employed to achieve the same results, or separate raising means may be employed to raise the sheet and form the space 106.

The fullness of material at the bight or fold area 101 not only isolates that portion of the sheet which is being processed, but also performs an equally important function of furnishing requisite plastic material for the formation of the new configuration. For this purpose, the plastic material may be caused to flow under the heat action and take entirely new forms, which, although of small dimension, can be vital to the ultimate success of the process. This added available material from the above discussed fullness, for example, is particularly valuable in the formation of a 180 degree bend of small radius in the material, in that it avoids the setting up of shearing stresses and cooling strains within the material, undesirable variations in thickness such as the thinning of the sheet at a point of wear or flexing, and finally it allows the addition of material at those critical points where added strength is desired or a preset spring action is incorporated as an integral part of the structure. In this way, a formative material of the general shape shown in Figure 4 may embody therein a surface 117 which provides a spring action to the side walls 103 and 104, urging them together so that when these side walls are flexed apart they will spring back to their original position, and even touch each other, if such action is desired. In this manner it will be seen that the invention permits the molding of fillets and the addition of material at critical points in the processed plastic sheet material and avoids all strains and failures incurred by known processes. As a result, not only does the process produce a more accurate formation of plastic material than has heretofore been possible with known equipment, but also the product so formed has greatly increased life and utility.

It will be understood that the elements above disclosed are only the principal ones employed in performing the invention and that these elements will readily lend themselves to inclusion in an automatic machine for performing the above operations successively in close relation on a single large sheet of thermoplastic material or upon a succession of smaller sheets, or both, where quantity production is desired. An automatic machine employing the above elements in the manner described will form the subject matter of a copending application which will be filed as a continuation-in-part hereof. While I have described above what is at present believed to be a preferred form of my invention, it will be readily understood that many variations will suggest themselves to those skilled in the art in the light of the above disclosure. All such variations which fall within the spirit of the invention are intended to be covered by and included in the generic terminology in the appended claims.

I claim:

1. The method of bending and setting a sheet of thermoplastic material to a predetermined shape which comprises folding a sheet of material to form a fold area extending in a generally-straight line, placing the folded sheet over a supporting member having good heat-conductive properties with the portions of the sheet at each side of the fold area being opposite sides of the supporting member, clamping said portions of the sheet against said supporting member, applying heat solely to the outer surface of the fold area while said portions of the sheet are clamped against the supporting member and in an amount sufficient to soften said area, and maintaining the inner surface of the fold area in contact with a heat-insulating medium during the application of heat to the outer surface thereof.

2. The method of claim 1 in which the heat initially is applied substantially along a line midway of the fold area.

3. The method of claim 1 in which heat is abstracted from the sides of the sheet at each side of the fold area through said clamping means while the fold area is being heated.

4. The method of claim 1 in which the center of the fold area initially is spaced from said supporting member and the fold area after being heated to the softening temperature is moved against said supporting member to cause heat to be abstracted from the fold area and the fold area thereby set.

5. The method of claim 4 in which the fold area is contoured to a predetermined shape during its heating and movement against said supporting member.

6. The method of claim 1 in which an air space is maintained between the fold area and the support during the heating of the fold area.

7. The method of claim 1 in which both the support member and the clamping members are of good heat-conducting material and the surfaces of said members in contact with the portions of the sheet at each side of the fold area are maintained at substantially the same temperature so that there is a balanced removal of heat from such portions of the sheet by conduction into said members, whereby there is no distortion nor change in the physical characteristics of such portions of the sheet as would result from different areas of such portions being heated to substantially different temperatures.

References Cited in the file of this patent

UNITED STATES PATENTS

| | | |
|---|---|---|
| 1,352,161 | Willard | Sept. 20, 1920 |
| 1,704,058 | Overbury | Mar. 5, 1929 |
| 1,738,334 | Taber | Dec. 3, 1929 |
| 1,821,413 | Whitehouse | Sept. 1, 1931 |
| 1,913,055 | Keller | June 6, 1933 |
| 2,169,315 | Yngve | Aug. 15, 1939 |
| 2,259,239 | Brown et al. | Oct. 14, 1941 |
| 2,270,162 | De Margitta | Jan. 13, 1942 |
| 2,318,950 | Larmour | May 11, 1943 |
| 2,324,838 | Harz et al. | July 20, 1943 |
| 2,419,864 | Westin | Apr. 29, 1947 |
| 2,452,357 | Collins | Oct. 26, 1948 |
| 2,487,494 | Taber | Nov. 8, 1949 |
| 2,487,495 | Taber | Nov. 8, 1949 |
| 2,581,222 | Varner | Jan. 1, 1952 |

FOREIGN PATENTS

| | | |
|---|---|---|
| 639,997 | Great Britain | July 12, 1950 |
| 752,221 | Great Britain | July 4, 1956 |